UNITED STATES PATENT OFFICE.

ALONZO H. MITCHELL, OF PHOENIX, ARIZONA.

PLASTER.

1,107,979.　Specification of Letters Patent.　Patented Aug. 18, 1914.

No Drawing.　Application filed September 9, 1913.　Serial No. 788,938.

*To all whom it may concern:*

Be it known that I, ALONZO H. MITCHELL, a citizen of the United States, residing at Phoenix, in the county of Maricopa and State of Arizona, have invented new and useful Improvements in Plaster, of which the following is a specification.

This invention relates to plastic compositions, and particularly to a plaster designed for either inside or outside use, the object of the invention being to provide a plaster which will adhere firmly to stone, brick, iron, cement, wood and other materials, which is hard and durable, absolutely water-proof and will not shrink, swell or crack, which may be employed for coating or plastering various surfaces to render them ornamental or water-proof or in filling and patching cracks in various materials, and which may be smoothly and evenly applied and worked out to a gloss finish.

In carrying my invention into practice, I provide a plastic composition of the character described comprising a vehicle consisting of kerosene and linseed oil, which may be combined with a suitable binder, such as Portland or other cement, with a filler consisting of sand or other suitable material.

In practice the kerosene and raw linseed oil are preferably mixed in equal proportions, which is essential to the production of a plastic composition possessing the desired characteristics, and the proportions of the solid materials may be varied to suit the particular kind of work to be done. In providing a plaster for outside use, the ingredients may be combined in the proportions of one-half part of kerosene to one-half part of raw linseed oil, one part of Portland or other suitable cement, and two parts of sand, such ingredients being thoroughly mixed together to form a plastic mass which may be applied by means of a trowel or other suitable tool and worked to a rough or smooth finish, as desired. In the production of a composition for coating shingles or other wood work the cement and sand may be combined with the kerosene and linseed oil in substantially equal proportions, and a greater or less amount of the cement or sand may be employed according to the desired thickness or density of the composition for various uses. Suitable coloring matter may be added whenever desired.

A composition of the character described not only possesses the characteristics stated, but may be employed for filling crevices and patching, brick and stone work, cement or concrete work, filling interstices in various structures for water-proofing and for use as a finishing coating on stone, brick work, wood work and other materials, it may be easily and smoothly applied by means of a trowel employed in place of mortar and ordinary cement wherever these substances are commonly used, and worked to a smooth finish presenting a glossy surface, if desired. By tinting or coloring any desired shade of composition may be produced to suit any particular kind of work to be done.

I claim:—

1. The herein described plastic composition comprising an intimate admixture, in equal proportions, of kerosene and linseed oil, combined with the cement and sand in suitable proportions to form a plaster.

2. The herein described plastic composition comprising an intimate admixture of kerosene and linseed oil, each one one-half part; cement, one part, and sand, two parts.

In testimony whereof I affix my signature in presence of two witnesses.

ALONZO H. MITCHELL.

Witnesses:
AXEL A. JOHNSON,
RAY O. HILBRANT.

---

Copies of this patent may be obtained for five cents each, by addressing the "Commissioner of Patents, Washington, D. C."